No. 642,543. Patented Jan. 30, 1900.
D. ASHLEY.
QUILLING MACHINE.
(Application filed May 9, 1899.)
(No Model.)
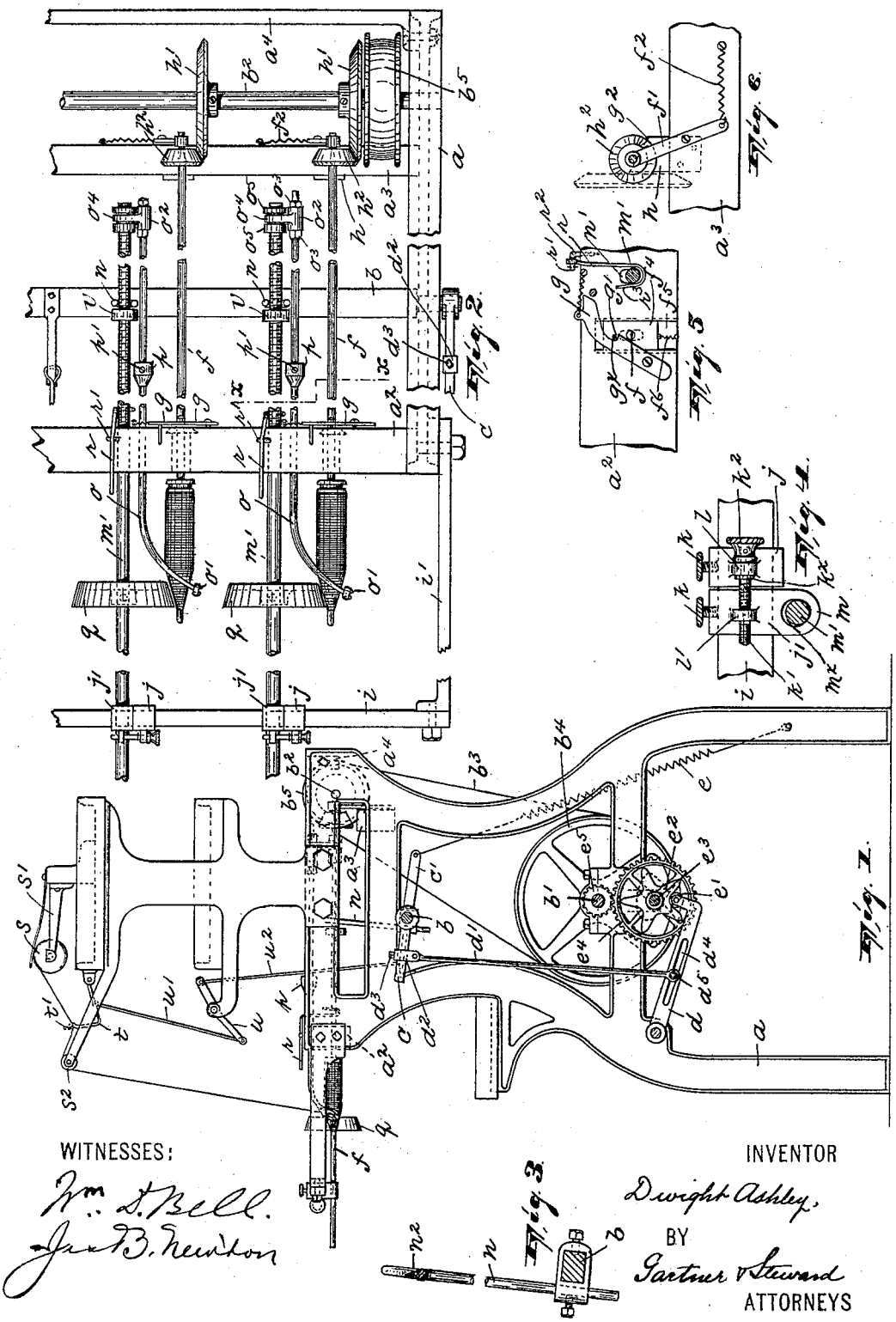
WITNESSES:
Wm L. Bell.
Jas. B. Newton
INVENTOR
Dwight Ashley,
BY
Gartner & Steward
ATTORNEYS

UNITED STATES PATENT OFFICE.

DWIGHT ASHLEY, OF PATERSON, NEW JERSEY, ASSIGNOR TO THE SIPP ELECTRIC AND MACHINE COMPANY, OF SAME PLACE.

QUILLING-MACHINE.

SPECIFICATION forming part of Letters Patent No. 642,543, dated January 30, 1900.

Application filed May 9, 1899. Serial No. 716,095. (No model.)

*To all whom it may concern:*

Be it known that I, DWIGHT ASHLEY, a citizen of the United States, residing in Paterson, in the county of Passaic and State of New Jersey, have invented certain new and useful Improvements in Quilling-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention constitutes an improvement in machines for winding quills or cops; and it has reference particularly to machines of this nature known as "horizontal" or "French" winders.

The invention consists generally in the improved winder and in the combination and arrangement of its various parts, substantially as will be hereinafter described and finally embodied in the clauses of the claim.

The invention is fully illustrated in the accompanying drawings, wherein—

Figure 1 is a view in side elevation of a winding-machine provided with my improvements. Fig. 2 is a top plan view, slightly enlarged, of a portion of one end of my improved winding-machine; and Figs. 3, 4, 5, and 6 are views of certain details involved in the invention.

In said drawings, $a$ designates one of the side frames of the machine, said side frames being suitably connected by several rails or beams, some of which (indicated by the reference-letters $a^2$, $a^3$, and $a^4$) are shown. Said side frames are also connected by three horizontal shafts $b$, $b'$, and $b^2$, all suitably journaled. The shaft $b$ is squared and is disposed in the upper portion of the machine, while the other two shafts $b'$ and $b^2$ are respectively disposed the one almost directly below said shaft $b$ and the other in a plane somewhat above that of the latter.

The shaft $b'$ is the main drive-shaft of the machine, and power is transmitted to it in any suitable manner. Said shaft and the shaft $b^2$ are operatively connected by a belt $b^3$, passing over pulleys $b^4$ and $b^5$, that are carried on said shafts.

The shaft $b$ is essentially a rock-shaft. It is provided with a pair of cranks $c\ c'$. A lever $d$ is suitably fulcrumed in the side frame beneath the crank $c$, which, it should be remarked, is disposed outside of the machine-frame and is connected to said crank $c$ by a pitman $d'$, adjustably connected to the crank through the medium of a block $d^2$, secured on the latter by a set-screw $d^3$, the connection between said pitman and the block being a pivotal one. Said pitman is also adjustably connected to the lever $d$ through the medium of a slot $d^4$, that is penetrated by a bolt $d^5$, extending through the pitman. The crank $c'$ is suitably connected to any portion of the frame by a spring $e$, said spring acting to normally hold the upturned end $e'$ of the lever $d$ in operative engagement with a star-cam $e^2$, journaled on a stub-shaft $e^3$, projecting laterally from the side frame and rigidly connected to a gear $e^4$, whereby a rotary motion is imparted to said cam from a pinion $e^5$, that is mounted on the shaft $b'$. By the foregoing mechanism the shaft $b$ is rocked.

$f$ denotes the spindle, which is adapted to carry the quill or upon which the cop is wound, as the case may be. Said spindle is journaled at its rear end in the upper end of a lever $f'$, that is fulcrumed upon the rail or beam $a^3$ and which is actuated by a spring $f^2$, connecting its lower end with said beam or rail. The other or forward end of said spindle projects through a vertically-extending elongated slot (shown in dotted lines in Fig. 5) provided in the rail or beam $a^2$, and it is sustained in a plate $f^4$, which it penetrates and which is guided for vertical movement in the rail or beam in a suitably-formed groove $f^5$, provided in the latter. Said plate is normally held downwardly by a spiral spring $f^6$, connecting it with said rail or beam.

$g$ designates a spring-actuated dog having a recess $g'$ formed in one of its sides and adapted to provide a bearing for a pin $g^×$, which the plate $f^4$ carries. It should be remarked that near its point of bearing in the upper end of the lever $f'$ the spindle $f$ rests upon the upper inclined edge $g^2$ of a plate $h$, that projects upwardly from the rail or beam $a^3$.

The detail views, Figs. 5 and 6 of the accompanying drawings, clearly show the construction of the above-described means for sustaining each of the several spindles $f$, Fig. 5 being a view taken on the line $xx$ in Fig. 1 and showing the relative arrangement of the dog, the spindle, and the vertically-movable plate carrying the latter, and Fig. 6 showing the spring-actuated lever whereby the rear end of the spindle is sustained and also the plate $h$, upon whose inclined edge $g^2$ the spindle rests.

The shaft $b^2$ carries a series of friction-cones $h'$, that are adapted to engage other friction-cones $h^2$, carried on the several spindles $f$. It will be seen that each spring-actuated lever $f'$ tends to keep the friction-cone $h^2$ in contact with the friction-cone $h'$.

$i$ designates a horizontal bar that extends across the front of the frame, being suitably supported by two or more arms $i'$, to which it is bolted and each of which is itself bolted to a portion of the frame of the machine. The bar $i$ penetrates pairs of blocks $j j'$, that are adjustably arranged thereon by virtue of a set-screw $k$, which each of said blocks carries and which is adapted to act against said bar. The block $j$ is intended to be first approximately adjusted to a selected position on the bar $i$, a more delicate adjustment of the block $j'$ being effected through the medium of a screw $k'$, penetrating and connecting integral bushings $l l'$, formed on the blocks, said screw having a milled head $k^2$ and a collar $k^\times$ disposed each side of the shaft. The threaded portion of the screw engages the bushing $l'$. In view of the above and the enlarged detail view presented in Fig. 4 it will be seen that when the screw is turned by its milled head $k^2$ it will act to move the block $j'$ toward or away from the block $j$ if the latter is securely held on the bar by its set-screw $k$.

I do not wish to be limited to the means above particularly described for effecting the adjustment of the parts $j j'$, for I consider it within the scope of my invention to employ any other suitable means for accomplishing this purpose.

The block $j'$ is provided with a downwardly-extending projection $m$ in an opening $m^\times$, in which a worm-shaft $m'$ has bearings, said opening being slightly larger than said worm-shaft and the threaded portion of said shaft being received by the bifurcated part of a fork $n$, projecting upwardly from the squared shaft $b$ and serving as a further bearing therefor. As shown in the drawings, a knife-edge $n^2$ is set obliquely in the bifurcated portion of the fork, and it is this part which is in engagement with the threaded portion of the worm-shaft $m'$. Said shaft $m$ projects through a vertically-elongated slot $n'$, formed in the rail or beam $a^2$.

The thread-guide consists of an arm $o$, that penetrates the rail $a^2$ and is connected with the shaft $m'$ at its rear end, its forward end being curved outwardly and over the spindle $f$ and provided with a thread-feed eyelet $o'$. The connection between the worm-shaft $m'$ and the arm $o$ consists of a sleeve $o^2$, adjustably secured on the arm by nuts $o^3$, and an integral projection $o^4$, formed on said sleeve and penetrated by said worm-shaft, being disposed between two collars $o^5$ on the latter. Said arm $o$ carries a cone $p$, adjustably mounted thereon by means of a set-screw $p'$, said cone being adapted to engage the free end of the spring-actuated dog, so as to move the latter and throw out of engagement therewith the pin $g^\times$.

It should be remarked that the worm-shaft $m'$ carries a beveled wheel $q$, the function of which is to bear against the cone of the cop being formed, so as to turn the worm-shaft $m'$ and feed the latter forwardly in the fork $n$.

$r$ is a lever that is fulcrumed upon a pintle $r'$, projecting laterally from a screw $r^2$ and whose rear end projects downwardly and is formed into a hook $r^3$, extending beneath the shaft $m'$.

The thread is fed from a series of bobbins $s$, that are journaled in suitable brackets $s'$ in the upper portion of the machine, the thread passing from said bobbins over suitably-arranged rollers $s^2$ to the spindle $f$ or the quill.

$t$ is a series of levers that are fulcrumed in the upper portion of the machine and are provided with thread-eyelets $t'$, through which the thread passes between the bobbins and the rollers $s^2$, said levers $t$ being connected to another suitably-fulcrumed lever $u$ by connecting-rods $u'$ and said last-named lever $u$ being connected to the crank $c$ by another connecting-rod $u^2$. The above-mentioned system of levers and connecting-rods constitutes a mechanism whereby compensation is effected for the variations in the feed of the thread that are produced by the traverse of the thread from one end to the other of the cone of the cop being formed.

In operation the shaft $b'$ being rotated motion is transmitted to the shaft $b^2$ and also to the shaft $b$, the former being revolved and the latter being rocked through the intermediate mechanisms, hereinbefore described, for effecting these movements. The rotation of the shaft $b^2$ produces, through the friction-cones $h'$ and $h^2$, the rotation of the several spindles $f$ which carry the quills to be wound or upon which the cops are wound, while the rocking movement imparted to the shaft $b$ produces vibrations of the forks $n$, and consequent longitudinal reciprocations of the several worm-shafts $m'$ and the thread-guides connected thereto. Thus the layers of the cop are formed. The advance of the thread-guide carriers in the building of the cops is effected by the worm-shafts $m'$, their beveled wheels $q$ being adapted to engage the conical portions of the cops, so as to rotate said wheels and the shafts, thus feeding the latter forward by virtue of their screw connections with the forks $n$. When a cop of the desired length has been built up, the cone $p$, which the arm $o$ of the thread-guide carriers carries and which has been previously set to a desired position, will act against the spring-actuated dog, so as to disengage the same from the plate $f^4$, thereby permitting the latter, and also the spindle which it carries, to drop, the spindle acting against the inclined edge of the plate $h$, and thereby having its rear moved laterally, so that contact between the friction-cones is destroyed and the rotation of the spindle consequently stopped. It is of course only necessary to raise the free end of the spindle $f$ until the pin $g^\times$ of the plate $f^4$ engages the recess $g'$ in the dog in order to reset this portion of the machine. In order to reset the thread-guide carrier and the mechanism which drives it, it is only necessary to depress the lever $r$, thereby raising the worm-shaft out of engagement with the fork, and then push the worm-shaft inwardly. By providing the lever $r$ there is no more handling of the parts necessary than that involved in simply pushing the worm-shaft back to the starting-point. $v$ simply designates blocks that are screwed upon the worm-shaft and may be adjusted thereon relatively to the forks, so that the worm-shafts are movable rearwardly to a greater or less extent, according to the initial point of winding of the cops.

It has been found that it is very necessary to provide the worm-shafts $m'$ with means for delicately adjusting them, and especially the beveled wheels which they carry, relatively to the cops to be formed. It is for this reason especially that I have provided pairs of blocks $j\ j'$, which are adjustably supported and one of which in each pair affords a bearing for the worm-shaft.

In Fig. 1 a heart-shaped cam $w$ is shown in dotted lines mounted on the stub-shaft $e^3$. This cam is adapted to be employed instead of the star-shaped cam in order to effect a slower operation of the machine, as in the winding of quills.

Having thus fully described my invention, what I claim as new, and desire to secure by Letters Patent, is—

1. In a quilling-machine, the combination, with the frame and a bar carried by said frame, of a suitably-supported thread-guide, a revoluble shaft adapted to be controlled by the cop being formed and operatively connected to, and adapted to control the movements of, said thread-guide relatively to said cop, a block adjustably mounted on said bar and providing bearings for the shaft, another block also adjustably mounted on said bar, and adjusting means connecting said blocks, substantially as described.

2. In a quilling-machine, the combination, with the frame and with a spindle horizontally journaled therein, of a horizontal bar carried by said frame, a suitably-supported thread-guide, a revoluble shaft disposed parallel to said spindle and adapted to be controlled by the cop being formed thereon, said shaft being operatively connected to, and adapted to control the movements of, said thread-guide relatively to said cop, a block adjustably mounted on said bar and providing bearings for said shaft, another block also adjustably mounted on said bar, and adjusting means connecting said blocks, substantially as described.

3. In a quilling-machine, the combination with the frame and with a spindle horizontally journaled therein, of a horizontal bar carried by said frame, a suitably-supported thread-guide, a revoluble shaft disposed parallel to said spindle and adapted to be controlled by the cop being formed thereon, said shaft being operatively connected to, and adapted to control the movements of, said thread-guide relatively to said cop, a block mounted on said bar and providing bearings for said shaft, another block also mounted on said bar, set-screws carried by said blocks and adapted to engage the bar, and an adjusting-screw connecting said blocks, substantially as described.

4. In a quilling-machine, the combination with the frame and with a spindle horizontally journaled therein, of a horizontal bar carried by said frame, a suitably-supported thread-guide, a revoluble shaft disposed parallel to said spindle and adapted to be controlled by the cop being formed thereon, said shaft being operatively connected to, and adapted to control the movements of, said thread-guide relatively to said cop, a block mounted on said bar and having an opening larger in diameter than, and providing bearings for, said shaft, another block also mounted on said bar, set-screws carried by said blocks and adapted to engage the bar, an adjusting-screw connecting said blocks, and a suitably-fulcrumed lifting-lever for said shaft, substantially as described.

5. In a quilling-machine, the combination of a suitably-supported thread-guide, a revoluble threaded shaft adapted to be controlled by the cop being formed and operatively connected to, and adapted to control the movements of, said thread-guide relatively to said cop, said shaft having a loose bearing, a fulcrumed fork having suitable actuating means and engaging the thread of said shaft, and a suitably-fulcrumed and hooked lifting-lever adapted to disengage said shaft from the fork, substantially as described.

In testimony that I claim the foregoing I have hereunto set my hand this 8th day of May, 1899.

DWIGHT ASHLEY.

Witnesses:
S. LONGBOTHAM,
C. POELSTRA.